3,393,261
PREHARDENING OF CEMENT BONDED-
FORMED BODIES
Ernst Herzig, Zurich, Marcel Munz, Killwangen, Aargau,
and Branko Simunic, Wettingen, Aargau, Switzerland,
assignors to Durisol A.-G. fur Leichtbaustoffe, Zurich,
Switzerland
Filed Mar. 5, 1965, Ser. No. 437,489
Claims priority, application Switzerland, Mar. 9, 1964,
3,029/64
11 Claims. (Cl. 264—82)

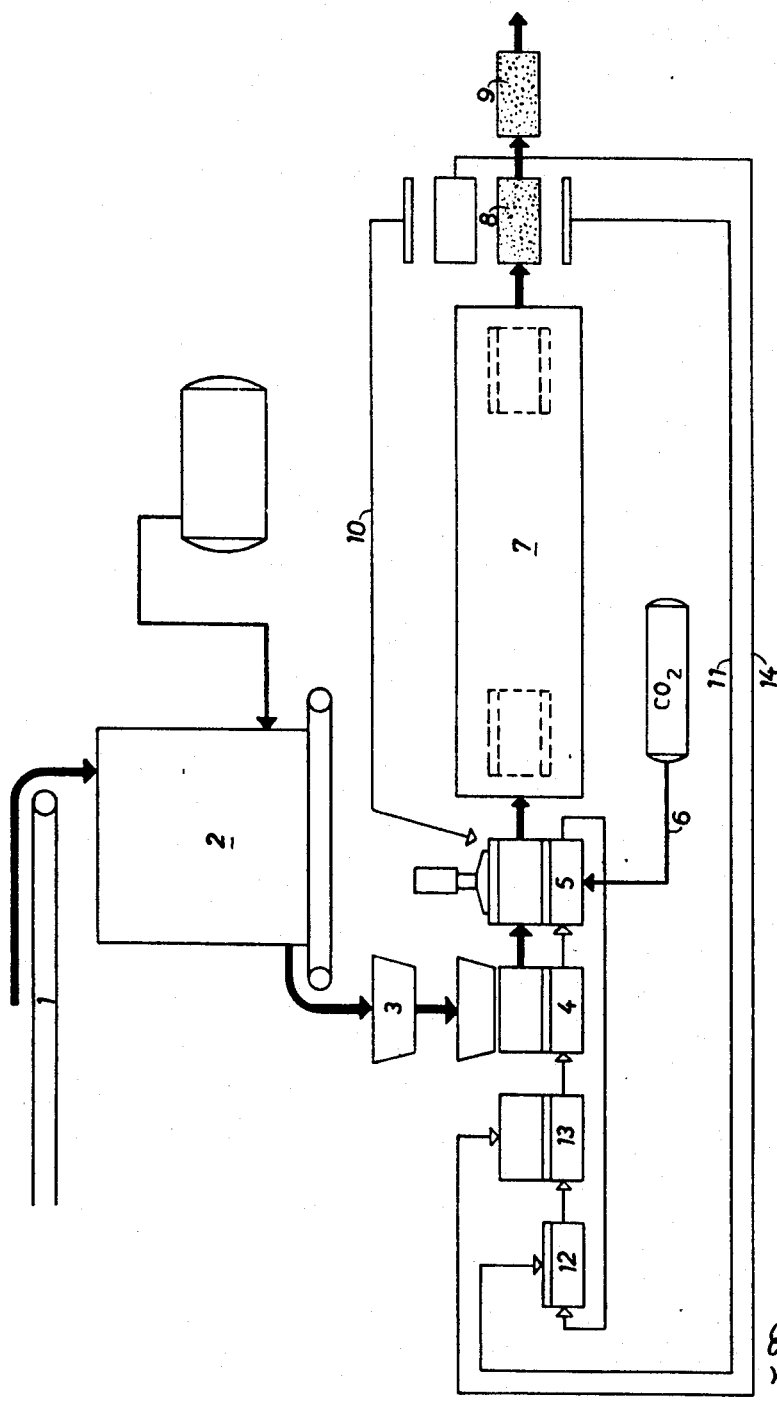

ABSTRACT OF THE DISCLOSURE

The present invention concerns a process for the rapid prehardening of cement bonded-formed bodies of light concrete material. A rapid prehardening of light concrete material until now was not possible because of the special difficulties which are encountered with the use of this material, which difficulties for instance do not exist when only cement shall be hardened or an ordinary concrete with usual concrete aggregates like sand and/or gravel. As the light concrete aggregates are often of organic material the heat transfer within this material is very difficult and therefore it is not possible to increase the rapidity of solidification by merely increasing the hardening temperature. In the process according to the invention said difficulties are overcome by adding to the light concrete mixture a certain amount of an alkali carbonate and by performing the prehardening step, which is carried out in the mold, in the presence of a certain amount of carbon dioxide containing gas.

---

The present invention relates to an improved process for the prehardening of cement bonded-formed bodies.

The inventive process is of great advantage in those situations where it is desired to immediately remove fresh concrete bodies sensitive to deforming forces from the mold or form after the molding operation. Such measure is necessary for reasons of economy during mass production and, namely, is of decisive importance for relatively loose structures of light concrete elements.

The known processes for the accelerated prehardening of concrete bodies in a concrete form or mold can be subdivided into two categories, to wit: The processes belonging to the first category employ quick-setting cements, in other words, accelerated hardening cements delivered from the factory or normal hardening cements mixed with hardening or setting accelerators. Many water soluble inorganic salts, heavy metal oxides soluble in alkali and a plurality of organic compounds serve as accelerator. These predominantly catalytically effective chemical additives must be added to the bonding or cementing agent before or during the mixing operation. Thus, the accelerated hardening is already in operation prior to molding of the mass and must, if the desired effect is to be achieved, already have considerably progressed during filling of the concrete form or mold. As a result, a disturbance of the hardening operation is necessarily associated with a worsening of the quality during continuous production.

The other category of the known processes is composed of the different thermal methods. Qualitatively these are faultless, however require a great deal of time. Apart from the time for filling and emptying and heating up of the autoclave, at least 40 minutes must be reckoned for the action of heat until achieving stripping from the mold.

This condition brings with it the requirement that for mass production many expensive forms or molds must be held in readiness as well as the disadvantage of poor utilization of the heating chamber (autoclaves) due to the space requirements of the introduced molding forms.

Accordingly, it is a primary object of the present invention to provide an improved process of the mentioned type which overcomes the disadvantages pointed out with regard to the known processes.

A further important object of the present invention is to provide an improved process for the prehardening of cement bonded-formed bodies which allow for economical and efficient mass production, relatively rapid prehardening and shorter residence time of the molded body in its form or mold.

In order to implement these and still further objects of the invention which will become apparent as the description proceeds, the present invention is concerned with an improved process for the quick prehardening of cement bonded-formed bodies, which comprises the steps of: adding to a bonding agent approximately 0.1% to 1.0% by weight of a carbonate in aqueous solution serving to accelerate setting of cement, said percent by weight of said carbonate being based upon the water-free carbonate, then introducing aggregates and preparing the entire mixture in usual manner in a concrete mixer, heating the entire mixture and introducing such into the molds, then after heating introducing a carbon dioxide-containing gas which initiates the actual solidification process at the desired period of time.

The carbonate added to the bonding agent, in other words the cement, are preferably alkali carbonates, such as sodium carbonate and potassium carbonate. The bonding agent can advantageously contain up to 20% by weight finely ground or comminuted clay minerals or silicates. Suitable examples of such clay minerals are bentonite, illite, kaolinite, pumicite, diatomite, and puzzolana. Regarding the aggregates or other components such can be inorganic or organic aggregates, in particular there being employed wood chips, and plant fibers such as sugar bagasse, hemp, and straw.

The practical execution of the inventive process incorporates the following principal steps which can be individually carried out in different ways.

The above-described fresh mixture, which advantageously has added up to 20% by weight of finely ground clay-containing minerals or silicates, is heated in the mixer or in a special vessel, preferably by an air-vapor mixture up to a temperature of about 60° C.–70° C. The heated mass is then directly or after predosing introduced into forms or molds and compacted, shaken, vibrated, shocked, or compressed. Shortly before achieving the final form of the mass, as a general rule directly in the mold, there is introduced a carbon dioxide containing gas which displaces the air which is present, whereby this addition can also take place a short time after filling of the fresh material. After approximately 5 minutes the prehardened body which is maintained heated is removed from the mold and transported to a place of storage for normal further hardening or transported to a heating chamber for thermal quick-hardening.

An illustrative example for carrying out the inventive process will now be given in conjunction with the flow diagram appearing in the accompanying single figure.

A mixture composed of the following constituents containing low water content is prepared in a counterflow mixer:

| | Kilograms |
|---|---|
| Mineralized wood planings or chips | 140 |
| Portland cement | 200 |
| Finely ground clay | 50 |
| Calcinated soda | 2.5 |

The completed mixture is emptied onto a conveyer band 1 and transported to a preheating station 2 and heated by steam to 60° C.–70° C. At station 3 the heated mass is divided in easily fillable predosing vessels or containers and from there jarred or shaken into the molds or forms at station 4 of the rotating or revolving press. In fact these molds themselves can be heated. Due to the rotating the revolving press through approximately 90° the filled mold arrives at station 5 where fitted plates or the like are mounted and pressed down to the predetermined final height of the molded body. By means of the conduit 5 carbon dioxide or carbon dioxide-containing gas is forced in through provided openings in a ratio of 2 kilograms per cubic meter of concrete material. After introduction into the heat insulating tunnel 7 the molded body which is still in the mold upon the conveyer arrives after about five minutes at the station 8. At this station the form or mold is removed and disassembled into its three parts. The formed or molded bodies travel in prehardened condition to the station 9, there are assembled into piles and are either delivered to a place of storage or, if hardening is to proceed more quickly, introduced into a heating chamber. In this heating chamber the stripped molded bodies can be further hardened while introducing carbon dioxide-containing gas. The press plates return to station 5 upon a track 10 or the like, the grate or screen is transported to the station 12 upon the track 11 and due to the rotation of a rotary device is supplied to station 13 where the mold box delivered by the track 14 is mounted.

It will be undestood that the present invention prevents the disadvantages of the known processes for accelerated hardening or setting in that, it renders possible initiation of the actual very accelerated solidification process at the desired period of time by the introduction of carbon dioxide-containing gas. This takes place in such a manner that the beginning of the skeleton formation a structural change no longer takes place, whereby it is possible to eliminate a reduction in quality, and the subsequent hydration of the cement salts completely occurs under favorable conditions.

In addition to the mentioned advantages the teachings of the present invention further provide a series of improvements from the standpoint of technology as well as also from the economical standpoint.

The normal dosing of the bonding or cementing agent can in most cases—with light concrete always—be reduced. A portion of the cement is replaced by a generally cheap component or aggregate. This preferably takes place by finely grounded clay containing-minerals, this additive favoring the uniform quality of the mixture and due to its special properties increases and accelerates the stabilization of the mixture.

In place of the usually employed special cement there can be used normal cement without a loss or reduction of strength. Furthermore, due to the saving in cement the density of the product is reduced, this being a decisive advantage particularly for insulating elements.

The foregoing detailed description has been given for clearness of understanding only, and no unnecesary limitations should be understood therefrom, as modifications will be obvious to those skilled in the art.

What is claimed is:

1. In the process for the rapid prehardening of cement bonded-formed bodies of light concrete material the cement containing bonding agent and the organic light concrete aggregates are mixed in usual manner in a concrete mixer and the entire mixture is heated and introduced into a mold and solidified therein and the prehardened formed body dismantled within a period of approximately five minutes, the step of mixing including the addition of approximately 0.1 to 1.0% by weight of an alkali carbonate in aqueous solution, the aforesaid percent by weight of alkali carbonate being based upon the water-free carbonate and referred to the weight of cement in the bonding agent an dthe step of solidification comprises initiating the solidification of the heated mixture of organic aggregates, bonding agent and aqueous solution in the mold by a treatment with a carbon dioxide containing gas.

2. A process for the rapid prehardening of cement bonded formed bodies of light concrete material according to claim 1, wherein the carbon dioxide containing gas provides carbon dioxide in a ratio of 2 kg. $CO_2$ per cubic meter of concrete material.

3. Process for the rapid prehardening of cement bonded-formed bodies of light concrete material according to claim 1 wherein the mixing is performed at a temperature of 60–70° C.

4. Process for the rapid prehardening of cement bonded-formed bodies of light concrete material according to claim 1 wherein said organic aggregates are selected from the group comprising wood chips and plant fibers.

5. Process for the rapid prehardening of cement bonded-formed bodies of light concrete material according to claim 4 wherein said plant fibers are selected from the group comprising sugar, bagasse, hemp and straw.

6. Process for the rapid prehardening of cement bonded-formed bodies of light concrete material according to claim 1 wherein said bonding agent contains up to 20% by weight silicates.

7. Process for the rapid prehardening of cement bonded-formed bodies of light concrete material according to claim 1 wherein said bonding agent contains up to 20% by weight of finely ground clay minerals.

8. Process for the rapid prehardening of cement bonded-formed bodies of light concrete material according to claim 1 wherein said alkali carbonate is a member selected rfom the group consisting of sodium carbonate and potassium carbonate.

9. Process for the rapid prehardening of cement bonded-formed bodies of light concrete material according to claim 1 wherein said cement containing bonding agent is cement.

10. Process for the rapid prehardening of cement bonded-formed bodies of light concrete material according claim 1 including the step of heating said mold.

11. Process for the rapid prehardening of cement bonded-formed bodies of light concrete material according to claim 1 wherein the molded material is kept in heated condition at a temperature of 60–70° C. until removed from the mold.

References Cited

UNITED STATES PATENTS

| | | | |
|---|---|---|---|
| 2,432,981 | 12/1947 | Abrahams. | |
| 2,665,996 | 1/1954 | Kalousek. | |
| 1,666,936 | 4/1928 | Kern | 264—82 |
| 1,473,445 | 11/1923 | Schumacher | 106—93 |
| 1,894,628 | 1/1933 | Mortland | 106—93 |
| 3,247,294 | 4/1966 | Sabouni | 264—44 |
| 2,496,895 | 2/1950 | Staley | 264—82 |

OTHER REFERENCES

The Chemistry of Cement and Concrete, 1956, pp. 252 and 253 relied upon.

ROBERT F. WHITE, *Primary Examiner.*

R. B. MOFFITT, J. H. SILBAUGH,
*Assistant Examiners.*